(12) United States Patent
Hong et al.

(10) Patent No.: US 11,875,729 B2
(45) Date of Patent: Jan. 16, 2024

(54) DISPLAY DEVICE, TEMPERATURE ESTIMATOR, AND METHOD OF DRIVING DISPLAY DEVICE

(71) Applicant: SAMSUNG DISPLAY CO., LTD., Yongin-si (KR)

(72) Inventors: Seokha Hong, Seoul (KR); Joon-Chul Goh, Suwon-si (KR); Jaesung Bae, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/813,379

(22) Filed: Jul. 19, 2022

(65) Prior Publication Data

US 2023/0186826 A1 Jun. 15, 2023

(30) Foreign Application Priority Data

Dec. 13, 2021 (KR) .................. 10-2021-0178043

(51) Int. Cl.
*G09G 3/20* (2006.01)
*G01K 7/16* (2006.01)
(Continued)

(52) U.S. Cl.
CPC ............ *G09G 3/2096* (2013.01); *G01K 7/16* (2013.01); *G09G 3/006* (2013.01); *G09G 3/3233* (2013.01);
(Continued)

(58) Field of Classification Search
CPC .... G09G 3/2096; G09G 3/006; G09G 3/3233; G09G 2300/0842; G09G 2320/0233;
(Continued)

(56) References Cited

U.S. PATENT DOCUMENTS

2011/0279466 A1* 11/2011 Park ..................... G09G 3/3648
345/581
2012/0274544 A1* 11/2012 Nakajima .............. G09G 3/342
315/307
(Continued)

FOREIGN PATENT DOCUMENTS

KR 10-2078263 2/2020

*Primary Examiner* — Nitin Patel
*Assistant Examiner* — Saifeldin E Elnafia
(74) *Attorney, Agent, or Firm* — F. CHAU & ASSOCIATES, LLC

(57) ABSTRACT

A display device includes a display panel including a panel region. The panel region includes a block, and the block includes a pixel. The display device further includes a temperature sensor sensing a region temperature of the panel region and a temperature estimator estimating a temperature of the display panel. The temperature estimator includes a stress calculator calculating an accumulated stress value corresponding to the block based on input image data, a temperature potential calculator calculating a temperature potential corresponding to the block based on the accumulated stress value and a resistance model related to a heat diffusion within the display panel, and a temperature calculator calculating a block temperature based on the region temperature and the temperature potential. The temperature of the display panel is estimated based on the block temperature.

16 Claims, 13 Drawing Sheets

(51) Int. Cl.
*G09G 3/00* (2006.01)
*G09G 3/3233* (2016.01)
(52) U.S. Cl.
CPC ............... *G09G 2300/0842* (2013.01); *G09G 2320/0233* (2013.01); *G09G 2320/0257* (2013.01); *G09G 2320/041* (2013.01); *G09G 2320/043* (2013.01); *G09G 2330/021* (2013.01); *G09G 2330/12* (2013.01)
(58) Field of Classification Search
CPC ..... G09G 2320/0257; G09G 2320/041; G09G 2320/043; G09G 2330/021; G09G 2330/12; G01K 7/16
See application file for complete search history.

(56) References Cited

U.S. PATENT DOCUMENTS

| | | | |
|---|---|---|---|
| 2016/0098957 A1* | 4/2016 | Eom | .................... G09G 3/3225 |
| | | | 315/309 |
| 2016/0351097 A1* | 12/2016 | Sato | ....................... G09G 3/344 |
| 2017/0206819 A1* | 7/2017 | Pyo | ..................... G09G 3/3225 |
| 2017/0236490 A1* | 8/2017 | Cheon | ....................... G09G 5/10 |
| | | | 345/691 |
| 2021/0035494 A1* | 2/2021 | Yildiz | ..................... G06F 1/203 |

* cited by examiner

DISPLAY DEVICE, TEMPERATURE ESTIMATOR, AND METHOD OF DRIVING DISPLAY DEVICE

CROSS-REFERENCE TO RELATED APPLICATIONS

This application claims priority under 35 U.S.C. § 119 to Korean Patent Application No. 10-2021-0178043, filed on Dec. 13, 2021 in the Korean Intellectual Property Office (KIPO), the disclosure of which is incorporated by reference herein in its entirety.

TECHNICAL FIELD

Embodiments of the present disclosure relate to a display device. More particularly, embodiments of the present disclosure relate to a display device, a temperature estimator, and a method of driving the display device.

DISCUSSION OF RELATED ART

A display device may include a display panel that displays an image via one or more pixels that emit light corresponding to the image. The display device may be driven via a driving signal to display the image.

However, the pixel may degrade over time as the display device is driven, and the display device may display an after-image as a result of the pixel degradation. The degradation of the pixel may correspond to the temperature of the display device. For example, the display device may generate heat as it is driven, and the heat may be diffused within the display device. There is therefore a need in the art for a display device that accurately measures and estimates a temperature of the display device.

SUMMARY

Aspects of the present disclosure provide a display device, a temperature estimator, and a method of driving a display device for accurately estimating a temperature of a display panel.

According to at least one embodiment, a display device is provided. The display device includes a display panel including a panel region. The panel region includes a block and the block includes a pixel. The display device further includes a temperature sensor sensing a region temperature of the panel region and a temperature estimator estimating a temperature of the display panel. The temperature estimator includes a stress calculator calculating an accumulated stress value corresponding to the block based on input image data, a temperature potential calculator calculating a temperature potential corresponding to the block based on the accumulated stress value and a resistance model related to a heat diffusion within the display panel, and a temperature calculator calculating a block temperature based on the region temperature and the temperature potential. The temperature of the display panel is estimated based on the block temperature.

In at least one embodiment, the stress calculator includes a stress generator generating stress values corresponding to the block based on the input image data, a weight multiplier multiplying the stress values by weights to obtain weighted stress values, and a stress accumulator generating the accumulated stress value by accumulating the weighted stress values.

In at least one embodiment, the display panel further includes a rear surface and a heat dissipation plate disposed on the rear surface. The temperature potential calculator calculates a temperature potential matrix including the temperature potential by multiplying an inverse conductance matrix representing the resistance model by a resistance of the heat dissipation plate and an accumulated stress matrix including the accumulated stress value.

In at least one embodiment, the temperature calculator calculates the block temperature by adding the temperature potential to the region temperature.

In at least one embodiment, the display panel further includes a plurality of panel regions and a plurality of blocks, and each panel region of the plurality of panel regions includes at least one block among the plurality of blocks.

In at least one embodiment, the display device further includes an after-image compensator generating compensated image data by compensating the input image data based on the block temperature.

In at least one embodiment, the display device may further include a heat dissipation plate disposed on a rear surface of the display panel. The temperature sensor is disposed on the heat dissipation plate.

In at least one embodiment, the display panel further includes a display area and a peripheral area partially surrounding the display area, the pixel is disposed in the display area, and the temperature sensor is disposed on the peripheral area.

According to at least one embodiment, a display device is provided. The display device includes a display panel including a display area and a peripheral area partially surrounding the display area. The display panel further includes a rear surface and a panel region. The display device further includes a heat dissipation plate disposed on the rear surface of the display panel, a temperature sensor disposed on the heat dissipation plate or the peripheral area and sensing a region temperature of the panel region of the display panel, and a temperature estimator estimating a temperature of the display panel based on input image data and the region temperature.

In at least one embodiment, the temperature sensor is disposed on a center of a region of the heat dissipation plate corresponding to the panel region of the display panel.

In at least one embodiment, the display device further includes a plurality of temperature sensors. Temperature sensors of the plurality of temperature sensors are spaced throughout the peripheral area.

According to at least one embodiment, a temperature estimator is provided. The temperature estimator includes a stress calculator calculating an accumulated stress value corresponding to a block of a display panel based on input image data, the block including a pixel, a temperature potential calculator calculating a temperature potential corresponding to the block based on the accumulated stress value and a resistance model related to a heat diffusion within the display panel, and a temperature calculator calculating a block temperature based on a region temperature of a panel region of the display panel and the temperature potential.

In at least one embodiment, the stress calculator includes a stress generator generating stress values corresponding to the block based on the input image data, a weight multiplier multiplying the stress values by weights to obtain weighted stress values, and a stress accumulator generating the accumulated stress value by accumulating the weighted stress values.

In at least one embodiment, the stress generator compensates the input image data using a parameter including a value representing a deviation in light emission characteristics among blocks of the display panel. The stress values are generated based on the parameter.

In at least one embodiment, the display panel further includes a rear surface and a heat dissipation plate disposed on the rear surface, and the temperature potential calculator calculates a temperature potential matrix including the temperature potential by multiplying an inverse conductance matrix representing the resistance model by a resistance of the heat dissipation plate and by an accumulated stress matrix including the accumulated stress value.

According to at least one embodiment, a method of driving a display device is provided. The method of driving the display device includes sensing a region temperature of a panel region of a display panel and calculating an accumulated stress value for a block of the display panel based on input image data. The block includes a pixel. The method further includes calculating a temperature potential corresponding to the block based on the accumulated stress value and a resistance model related to a heat diffusion within the display panel, and calculating a block temperature based on the region temperature and the temperature potential.

In at least one embodiment, the method further includes generating stress values corresponding to the block based on the input image data, multiplying the stress values by weights to obtain weighted stress values, and accumulating the weighted stress values to obtain the accumulated stress value.

In at least one embodiment, the method further includes calculating a temperature potential matrix including the temperature potential by multiplying an inverse conductance matrix representing the resistance model by an accumulated stress matrix including the accumulated stress value and a resistance of a heat dissipation plate disposed on a rear surface of the display panel to obtain the temperature potential.

In at least one embodiment, the method further includes adding the temperature potential to the region temperature to obtain the block temperature.

In at least one embodiment, the method further includes generating compensated image data by compensating the input image data based on the block temperature.

BRIEF DESCRIPTION OF THE DRAWINGS

The above and other aspects and features of the present disclosure will become more apparent by describing in detail embodiments thereof with reference to the accompanying drawings, in which.

DETAILED DESCRIPTION

A display device may include a display panel that displays an image via one or more pixels that emit light corresponding to the image. The display device may be driven via a driving signal to display the image. However, the pixel may degrade over time as the display device is driven, and the display device may display an after-image as a result of the pixel degradation. The degradation of the pixel may correspond to the temperature of the display device. For example, heat generated in the display device may be diffused within the display device. There is therefore a need in the art for a display device that accurately measures and estimates the temperature of the display device.

Accordingly, an embodiment of the present disclosure provides a display device that accurately measures a temperature of a panel region of a display panel of the display device and accurately estimates a temperature of a block of the display panel, such that a temperature of the display panel is estimated based on the temperature of the block. Furthermore, an embodiment of the present disclosure provides a display device that compensates image data based on the temperature of the block, such that the occurrence of an after-image in the display panel is mitigated.

Embodiments of the present disclosure will be described more fully hereinafter with reference to the accompanying drawings. As used herein, the singular forms "a," "an" and "the" are intended to include the plural forms as well, unless the context clearly indicates otherwise. It will be understood that when an element or layer is referred to as being "over," "above," "on," "below," "under," "beneath," "connected to" or "coupled to" another element or layer, it may be directly over, above, on, below, under, beneath, connected or coupled to the other element or layer or intervening elements or layers may be present.

Figure 1:
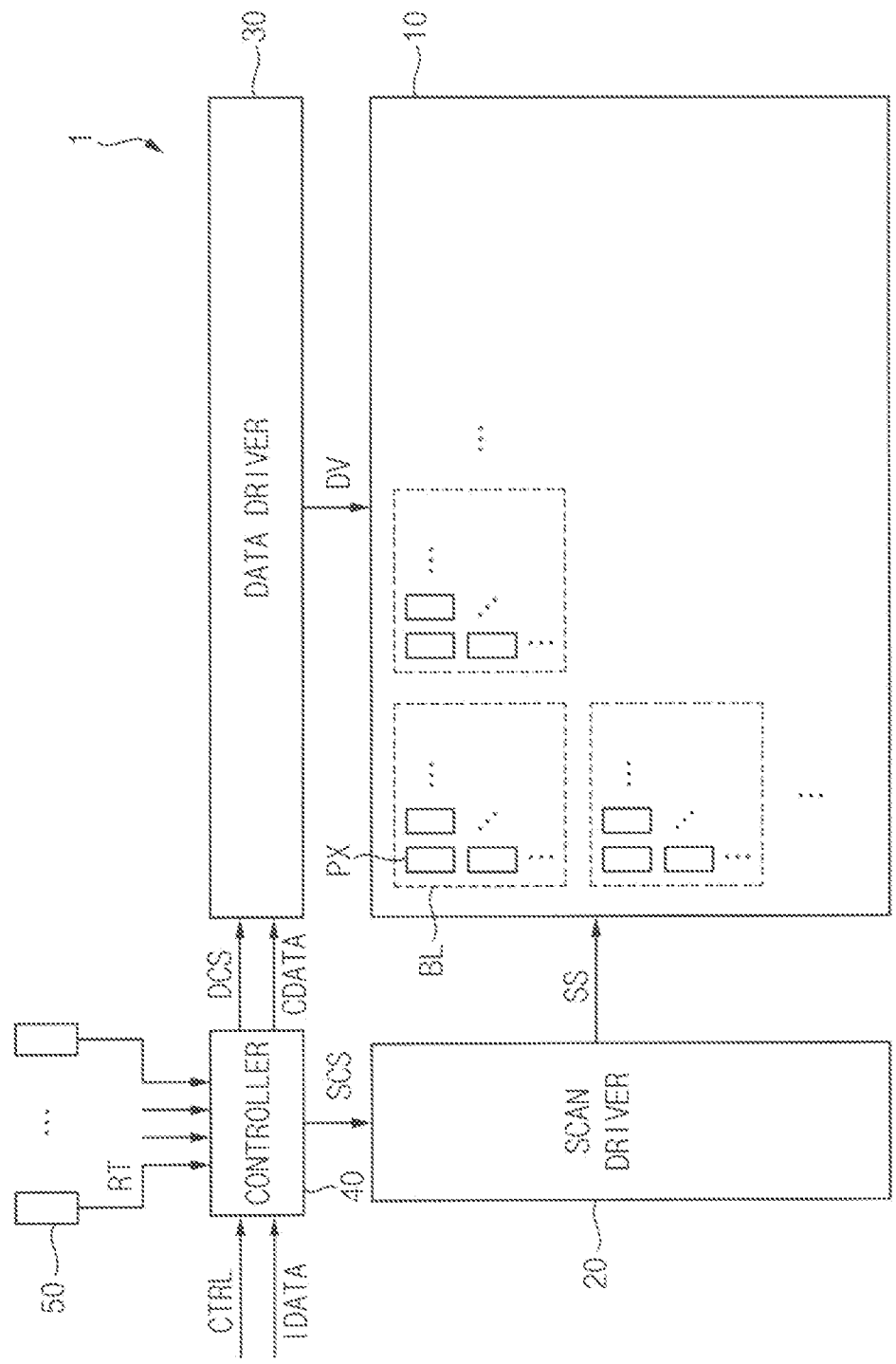
FIG. 1 is a block diagram illustrating a display device according to at least one embodiment.

FIG. 1 is a block diagram illustrating a display device 1 according to at least one embodiment.

Referring to FIG. 1, in some aspects, the display device 1 includes a display panel 10, a scan driver 20, a data driver 30, a controller 40, and one or more temperature sensors 50.

According to some aspects, the display panel 10 includes one or more pixels PX. The display panel 10 receives scan signals SS from the scan driver 20 and receives a data voltage DV from the data driver 30. According to some aspects, the pixel PX emits light based on the scan signal SS and the data voltage DV.

According to some aspects, the pixel PX includes a light emitting diode ("LED"). In at least one embodiment, the pixel PX is implemented as an organic light emitting diode ("OLED") and the display panel 10 is an organic light emitting display panel. In at least one embodiment, the pixel PX is implemented as an inorganic light emitting diode, a quantum dot light emitting diode, or the like.

According to some aspects, the display panel 10 includes at least one block BL. In some embodiments, the block BL includes at least one pixel PX. In at least one embodiment, each block BL includes a plurality of pixels PX, and a number of blocks BL is less than a number of pixels of the plurality of pixels PX. In at least one embodiment, each of the blocks BL includes one pixel PX, and the number of the blocks BL is equal to the number of the pixels PX.

According to some aspects, the scan driver 20 receives a scan control signal SCS from the controller 40. According to some aspects, the scan driver 20 generates a scan signal SS based on the scan control signal SCS. In some embodiments, the scan driver 20 provides the scan signal SS to the display panel 10.

According to some aspects, the data driver 30 receives a data control signal DCS and compensated image data CDATA from the controller 40. According to some embodiments, the data driver 30 generates the data voltage DV based on the data control signal DCS and the compensated image data CDATA. In some embodiments, the data driver 30 provides the data voltage DV to the display panel 10.

The controller 40 may be referred to as a timing controller ("T-CON"). According to some aspects, the controller 40 receives input image data IDATA and a control signal CTRL from an external host processor, such as a graphics processing unit ("GPU"), a graphics card, or the processor 1110 described with reference to FIG. 14, and receives a region temperature RT from the temperature sensor 50. According to some aspects, each temperature sensor 50 provides a region temperature RT to the controller 40. According to some aspects, the controller 40 generates the scan control signal SCS, the data control signal DCS, and the compensated image data CDATA based on the input image data IDATA, the control signal CTRL, and the one or more region temperatures RTRT. In some embodiments, the controller 40 generates the compensated image data CDATA by compensating the input image data IDATA based on the one or more region temperatures RT. In some embodiments, the controller 40 provides the scan control signal SCS to the scan driver 20 and provides the data control signal DCS and the compensated image data CDATA to the data driver 30.

According to some aspects, the temperature sensor 50 senses the region temperature RT of a panel region of the display panel 10. In some embodiments, the temperature sensor 50 provides the region temperatures RT to the controller 40. The temperature sensor 50 and the panel region PR of the display panel 10 are described in further detail with reference to FIGS. 4-5 and 12.

Figure 2:
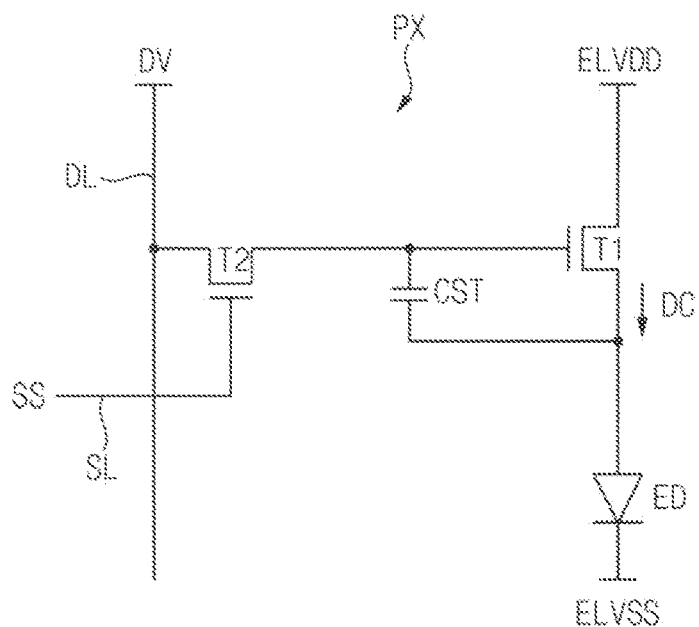
FIG. 2 is a circuit diagram illustrating a pixel included in the display device of FIG. 1.

FIG. 2 is a circuit diagram illustrating the pixel PX included in the display device 1 described with reference to FIG. 1.

According to some aspects, a block BL of the display device 1 includes a pixel PX, a scan line SL, and a data DL. Referring to FIG. 2, according to some aspects, the pixel PX is connected to the scan line SL and the data line DL. According to some aspects, the pixel PX includes a driving transistor T1, a switching transistor T2, a storage capacitor CST, and a light emitting diode ED.

In some embodiments, the switching transistor T2 transmits the data voltage DV that is transmitted from the data line DL in response to the scan signal SS that is transmitted from the scan line SL. In some embodiments, the driving transistor T1 generates a driving current DC. In some embodiments, the driving current DC flows from a line transmitting a first power voltage ELVDD to a line transmitting a second power voltage ELVSS based on the data voltage DV. In some embodiments, the storage capacitor CST stores the data voltage DV. In some embodiments, the light emitting diode ED emits light based on the driving current DC.

Figure 3:
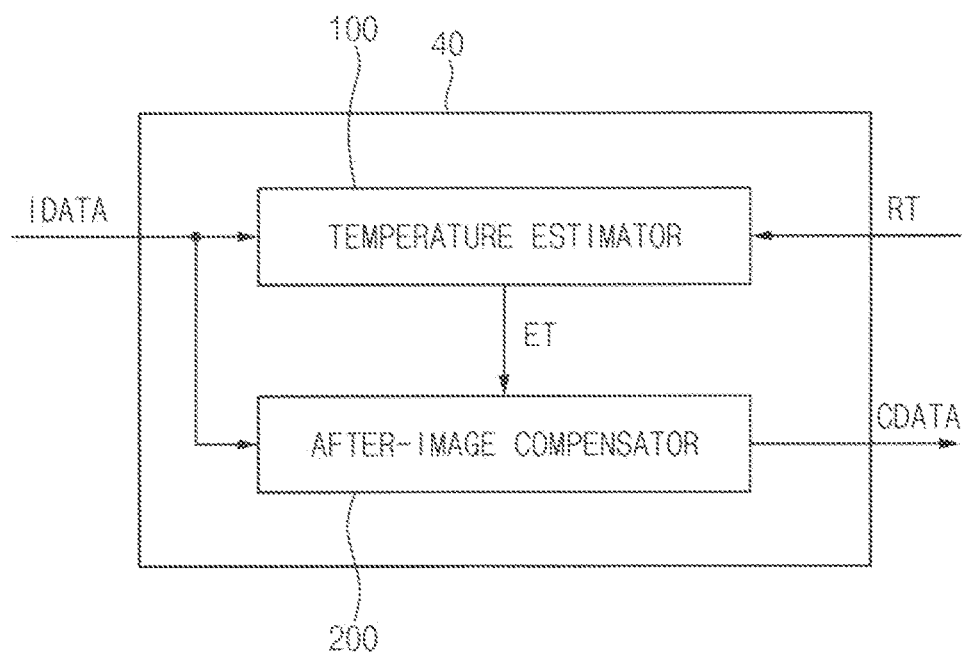
FIG. 3 is a block diagram illustrating a controller included in the display device of FIG. 1.

FIG. 3 is a block diagram illustrating the controller 40 included in the display device 1 described with reference to FIG. 1.

Referring to FIGS. 1 and 3, in at least one embodiment, the controller 40 includes a temperature estimator 100 and an after-image compensator 200. In at least one embodiment, at least one of the temperature estimator 100 and the after-image compensator 200 are disposed externally to the controller 40.

According to some aspects, the temperature estimator 100 estimates a temperature of the display panel 10 based on the input image data IDATA and the region temperature RT. For example, in some embodiments, the temperature estimator 100 calculates one or more block temperatures BT of the one or more blocks BL, and the temperature of the display panel is estimated based on the block temperature BT.

According to some aspects, the after-image compensator 200 generates the compensated image data CDATA based on the input image data IDATA and the block temperature BT. In some embodiments, the after-image compensator 200 generates the compensated image data CDATA by compensating the input image data IDATA based on the block temperature BT. For example, the after-image compensator 200 may decrease grayscales of the input image data IDATA corresponding to a block BL when a block temperature BT corresponding to the block BL is greater than the temperature of the display panel 10. An after-image of the display device 1 may be affected by a temperature of the display panel 10, which corresponds to an actual temperature of a block BL disposed in the display panel 10. Accordingly, in some embodiments, the after-image compensator 200 compensates the input image data IDATA based on the block temperature BT for the block BL, so that the compensated image data CDATA is provided to the data driver 30 to compensate for the after-image of the display device 1.

Figure 4:
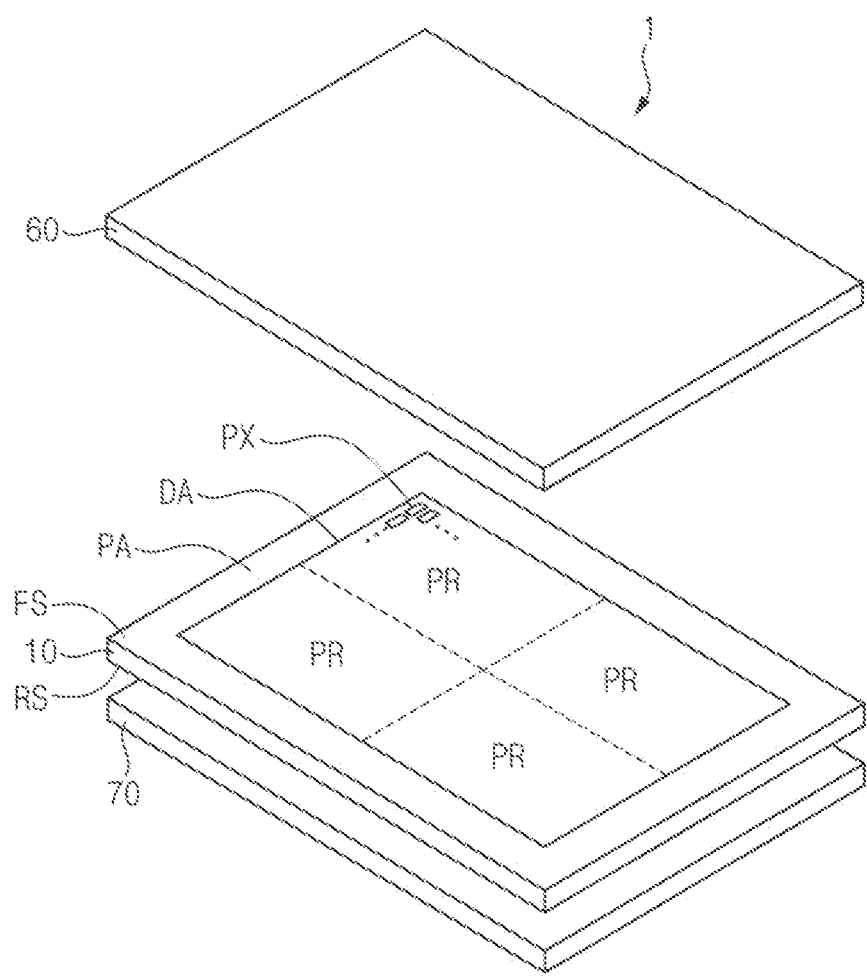
FIG. 4 is an exploded perspective view illustrating a display device according to at least one embodiment.
Figure 5:
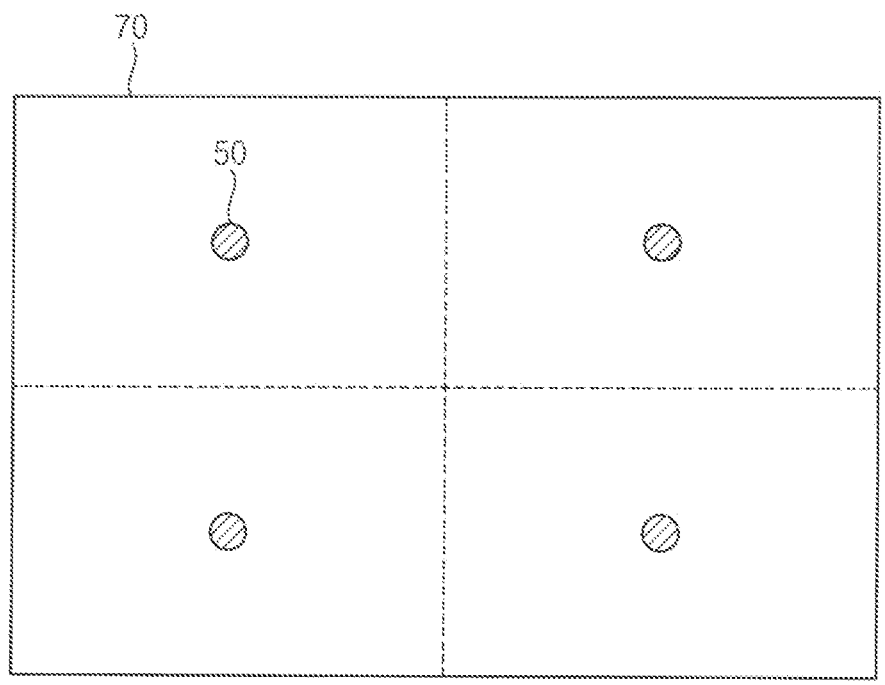
FIG. 5 is a plan view illustrating a heat dissipation plate included in the display device of FIG. 4.

FIG. 4 is an exploded perspective view illustrating a display device 1 according to at least one embodiment. FIG. 5 is a plan view illustrating a heat dissipation plate 70 included in the display device 1 described with reference to FIG. 4.

Referring to FIGS. 1, 3, 4, and 5, according to some aspects, the display device 1 includes a display panel 10, a window 60, a heat dissipation plate 70, and the temperature sensor 50.

According to some aspects, the display panel 10 includes a display area DA and a peripheral area PA. In some embodiments, one or more pixels PX are disposed in the display area DA such that the display area DA displays an image. According to some aspects, the peripheral area PA partially surrounds the display area DA and does not display an image.

In some embodiments, the scan driver 20 is disposed in the peripheral area PA. In at least one embodiment, the data driver 30 and the controller 40 are disposed on a flexible circuit, and the flexible circuit is connected to the peripheral area PA. In at least one embodiment, the data driver 30 and the controller 40 are disposed in the peripheral area PA.

According to some aspects, the display panel 10 includes one or more panel regions PR. In some embodiments, a temperature sensor 50 senses a region temperature RT of the panel region PR. In some embodiments, the panel region PR includes at least one block BL. In at least one embodiment, each panel region PR includes a plurality of blocks BL. In such an embodiment, a number of panel region PR is less than a number of blocks of the plurality of blocks BL. In at least one embodiment, each panel region PR includes one block BL, and the number of panel region PR is equal to the number of the blocks BL.

According to some aspects, the window 60 is disposed on a front surface FS of the display panel 10. In some embodiments, the front surface FS of the display panel 10 is a display surface on which an image is displayed by the display device 1. In some embodiments, the window 60 protects the front surface FS of the display panel 10. For example, in some embodiments, the window 60 includes glass, plastic, or the like.

According to some aspects, the heat dissipation plate 70 is disposed on a rear surface RS of the display panel 10. In some embodiments, the rear surface RS of the display panel 10 is disposed opposite to the front surface FS of the display panel 10 and is a non-display surface on which an image is not displayed. According to some aspects, the heat dissipation plate 70 dissipates heat provided by the display panel 10. For example, in some embodiments, the heat dissipation plate 70 is formed of a material with high thermal conductivity (e.g., a metal, an alloy, etc.).

In embodiments, the temperature sensor 50 is disposed on the heat dissipation plate 70. In some embodiments, the temperature sensor 50 is integrated into the heat dissipation plate 70. In some embodiments, the temperature sensor 50 is a thermistor.

According to some aspects, the temperature sensor 50 is disposed on a center of a region of the heat dissipation plate 70 corresponding to the panel region PR of the display panel 10. In an example, referring to FIG. 5, the display panel 10 includes four panel regions PR and the heat dissipation plate 70 includes four regions respectively disposed above the four panel regions PR. Four temperature sensors 50 are respectively disposed on the centers of the regions of the heat dissipation plate 70. Accordingly, the four temperature sensors 50 respectively sense the region temperatures RT of the four panel regions PR of the display panel 10.

Figure 6:
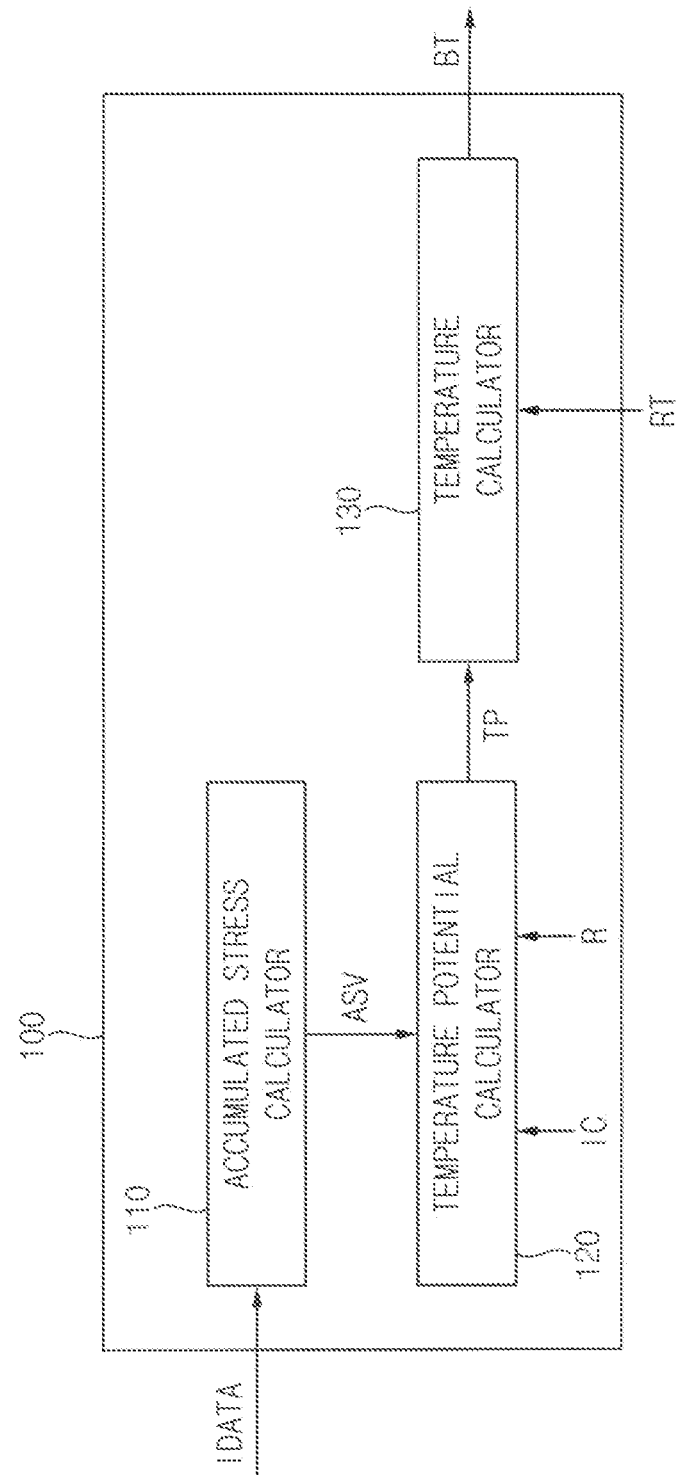
FIG. 6 is a block diagram illustrating a temperature estimator included in a controller of FIG. 3.
Figure 7:
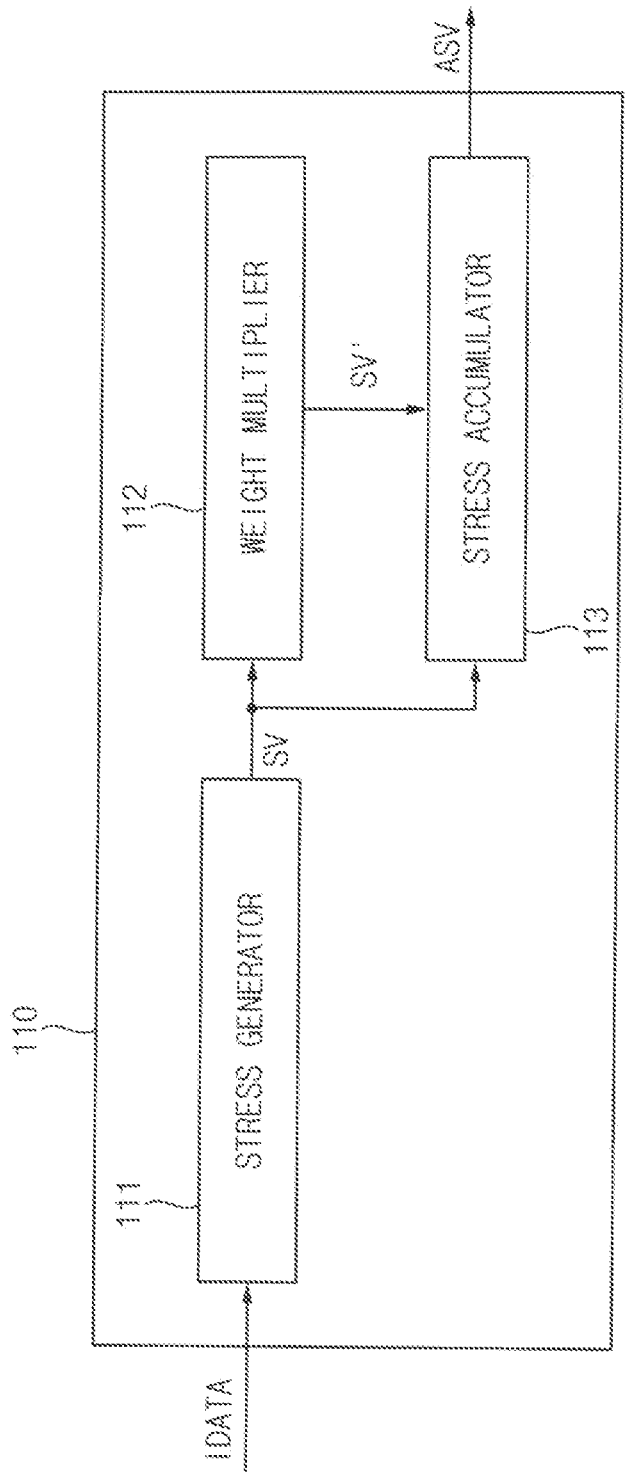
FIG. 7 is a block diagram illustrating an accumulated stress calculator included in a temperature estimator of FIG. 6.
Figure 8:
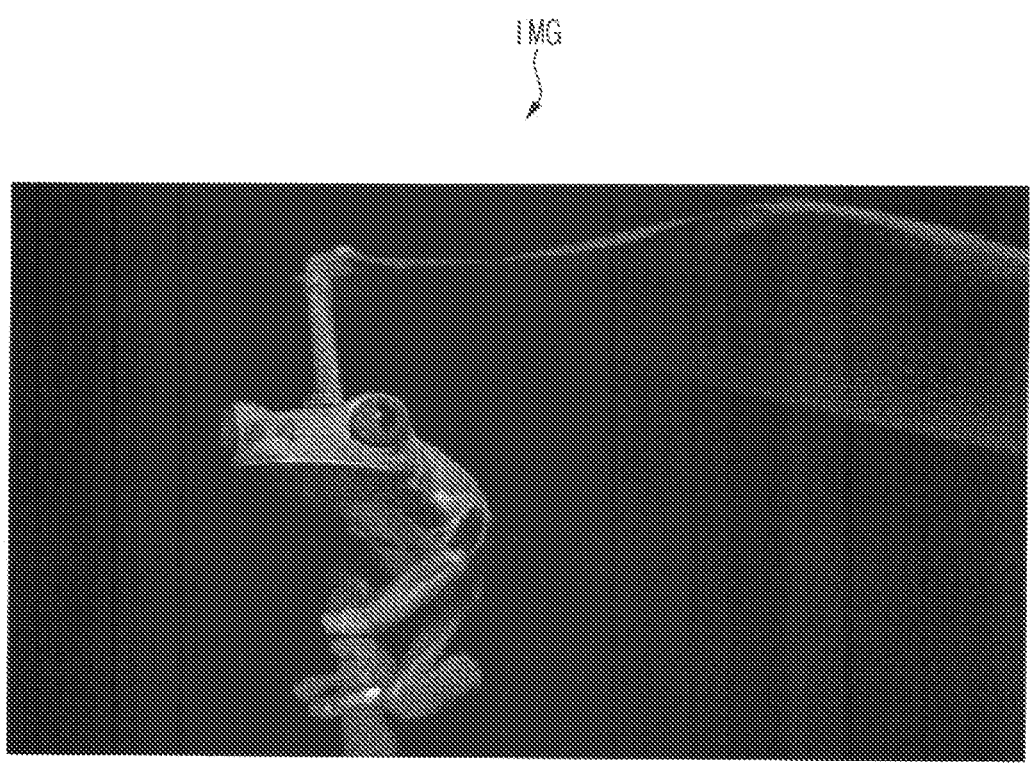
FIG. 8 is a diagram illustrating an image displayed based on input image data according to at least one embodiment.
Figure 9:
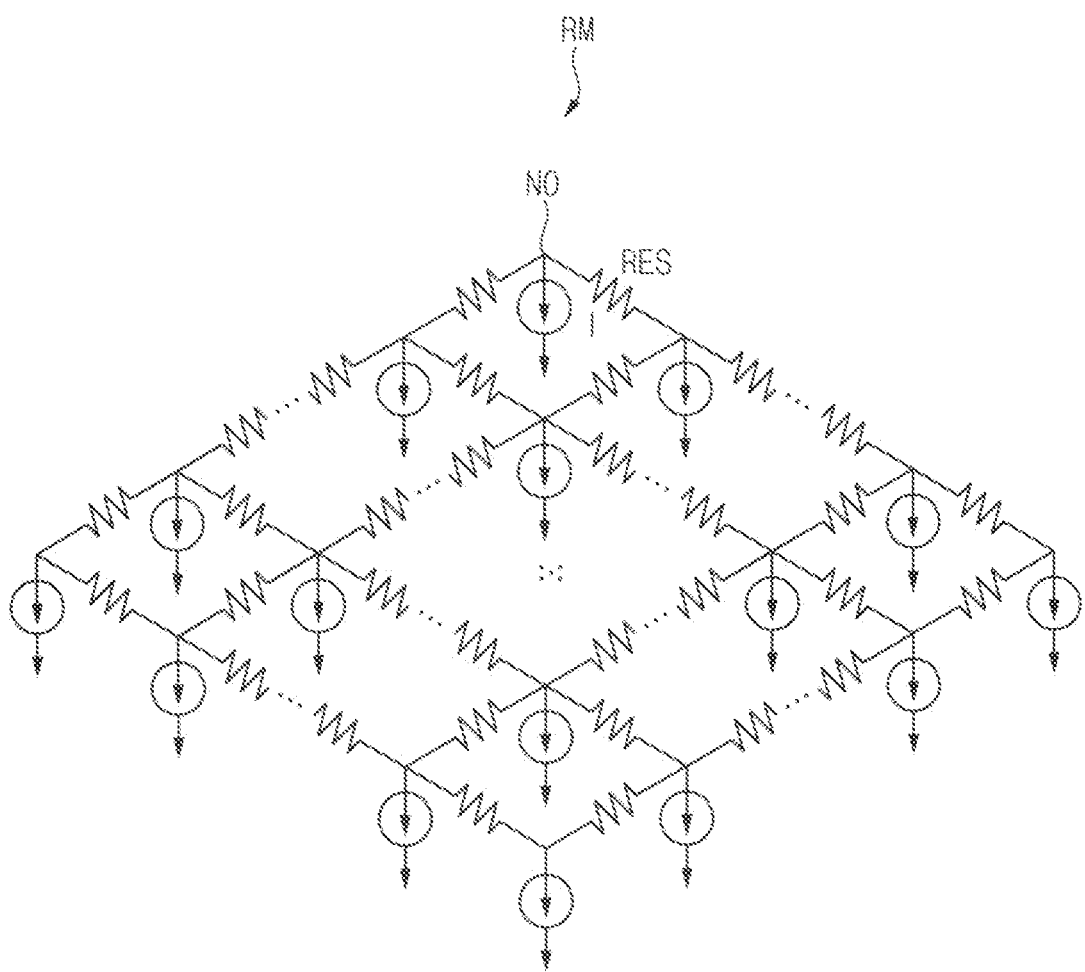
FIG. 9 is a diagram for describing a resistance model of a display panel according to at least one embodiment.
Figure 10:
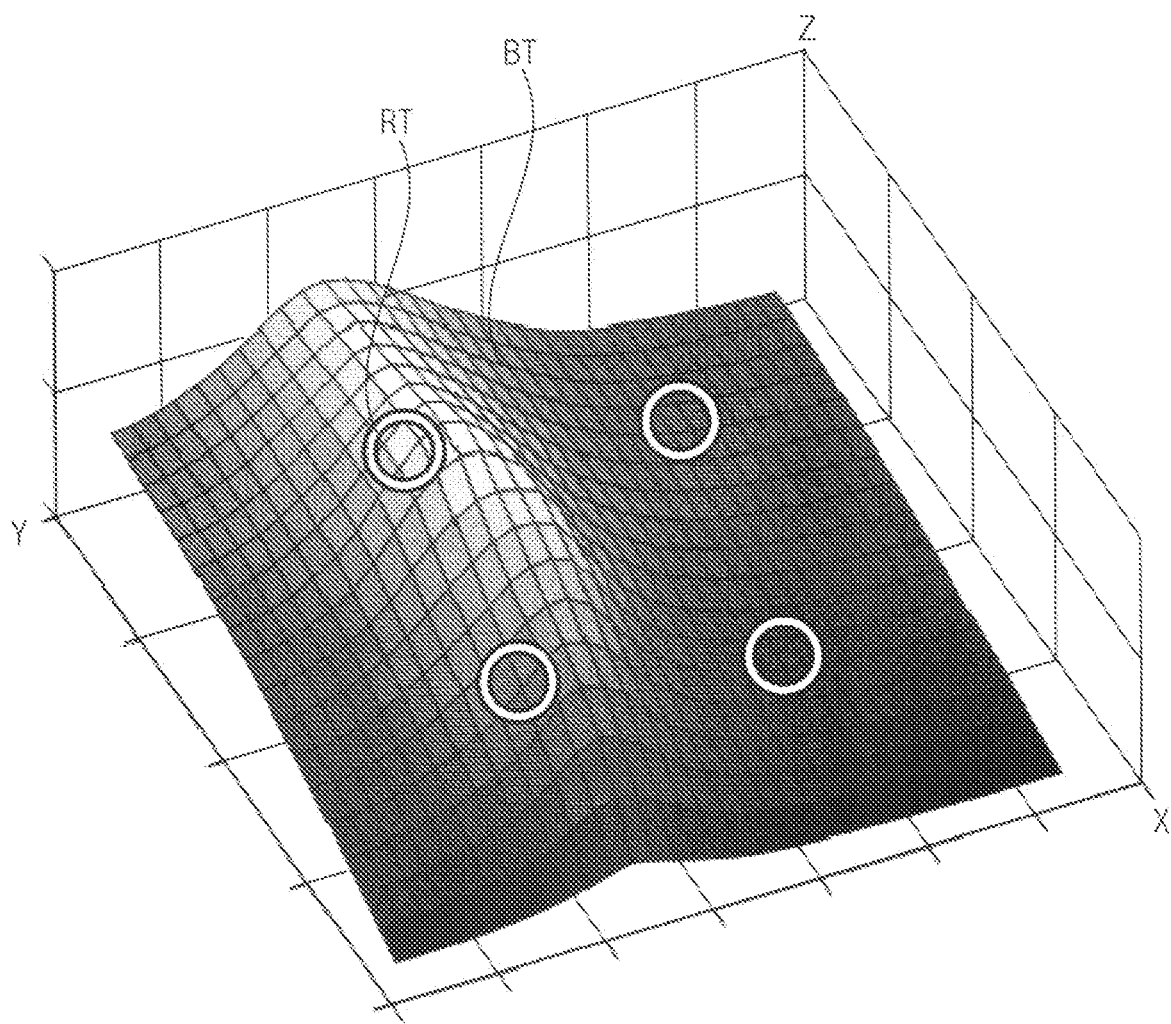
FIG. 10 is a diagram illustrating a temperature profile of a display panel according to at least one embodiment.

FIG. 6 is a block diagram illustrating the temperature estimator 100 included in the controller described with reference to FIG. 3. FIG. 7 is a block diagram illustrating a stress calculator 110 included in the temperature estimator 100 described with reference to FIG. 6. FIG. 8 is a diagram illustrating an image IMG displayed based on the input image data IDATA described with reference to FIG. 6. FIG. 9 is a diagram for describing a resistance model RM of a display panel 10 according to at least one embodiment. FIG. 10 is a diagram illustrating a temperature profile of a display panel 10 according to at least one embodiment.

Referring to FIGS. 1, 5, 6, 7, 8, 9, and 10, according to some aspects, the temperature estimator 100 includes a stress calculator 110, a temperature potential calculator 120, and a temperature calculator 130. In some embodiments, each of the temperature estimator 100, the stress calculator 110, the stress generator 111, the weight multiplier 112, the stress accumulator 113, and components thereof are implemented as one or more hardware circuits, as firmware, as software, or as a combination thereof. As used herein, in some embodiments, software is stored in memory (such as memory included in a memory device 1120 as described with reference to FIG. 14) and is executed by a processor (such as processor 1110 as described with reference to FIG. 14) to perform functions associated with the software.

According to some aspects, the stress calculator 110 calculates an accumulated stress value ASV for the block BL based on the input image data IDATA. Heat generated in the block BL of the display panel 10 may be affected by the accumulated stress values ASV. For example, an increase in an accumulated stress value ASV corresponding to a block BL may increase heat generated by the block BL. In some embodiments, the stress calculator 110 includes a stress generator 111, a weight multiplier 112, and a stress accumulator 113.

According to some aspects, the stress generator 111 generates one or more stress values SV for the block BL based on the input image data IDATA. In some embodiments, the stress value SV corresponds to a luminance (grayscale value) of the input image data IDATA for the block BL. Referring to FIG. 8, an image IMG is displayed by the display device 1 based on the input image data IDATA. A luminance of the image IMG corresponding to the luminance of the input image data IDATA may be different for each block BL. In some embodiments, the luminance of the input image data IDATA for the block BL is generally proportional to a current flowing through the block BL, and accordingly, the stress generator 111 generates one or more stress values SV for the block BL corresponding to the current flowing through the block BL based on the input image data IDATA.

In some embodiments, the stress values SV are generated from N most recent frames among frames included in the input image data IDATA, where N is a natural number. A recent frame may influence the temperature of the display panel 10 to a greater degree than a previous frame that precedes the recent frame. Accordingly, in some embodiments, the stress values SV are generated based on the N most recent frames of the input image data IDATA.

According to some aspects, the weight multiplier 112 multiplies a stress value SV by a weight WT to obtain a weighted stress value SV':

$$SV'=WT \times SV \qquad (1)$$

In at least one embodiment, the weight multiplier 112 multiplies stress values SV respectively corresponding to a first frame through an $N-1^{th}$ frame of the input image data IDATA by one or more weights WT. In some embodiments, the weight WT includes a value that is less than one. For example, in some cases, the weight WT includes a value that is equal to or greater than zero and is less than one.

In some embodiments, the weights WT include different values from each other. In an example, a weight WT multiplied to a stress value SV corresponding to an $N-1^{th}$ frame may be greater than a weight WT multiplied to a stress values SV corresponding to a first frame. A recent frame may influence the temperature of the display panel 10 to a greater degree than a previous frame preceding the recent frame, and accordingly, in some embodiments, a weight WT multiplied to a stress value SV for a recent frame is greater than a weight WT multiplied to a stress value SV for a previous frame.

According to some aspects, the stress accumulator 113 generates the accumulated stress value ASV by accumulating the weighted stress values SV'. For example, in at least one embodiment, the stress accumulator 113 generates the accumulated stress value ASV by accumulating the weighted stress values SV' corresponding to the first to $N-1^{th}$ frames of the image data IDATA and adding a stress value SV of an $N^{th}$ frame to the accumulated stress values SV':

$$ASV = \sum_{k=1}^{n-1} SV'_k + SV_n \qquad (2)$$

According to some aspects, the temperature potential calculator 120 calculates one or more temperature potentials TP for the blocks BL based on one or more accumulated stress values ASV corresponding to the blocks BL and a resistance model RM related to heat diffusion within the display panel 10. In some embodiments, the temperature potential TP corresponds to a relative temperature among the blocks BL. In some embodiments, the temperature potential calculator 120 calculates the temperature potential TP based on one or more accumulated stress values ASV, which relate to heat generated in the display panel 10, and the resistance model RM, which relates to heat diffusion within the display panel 10.

According to some aspects, the display panel 10 includes one or more resistors RES. According to some aspects, the resistance model RM includes the one or more resistors RES. In some embodiments, the resistors RES are arranged in a mesh structure. In some embodiments, a resistor RES is connected between blocks BL of a proximate pair of blocks BL. Referring to FIG. 9, a block BL is implemented as a node NO, a wiring or the like connected between blocks BL is implemented as a resistor RES connected between the nodes NO, and a current I flowing through the node NO corresponds to the accumulated stress value ASV of the block BL.

In some embodiments, the temperature potential calculator 120 calculates a temperature potential matrix including the temperature potential TP by multiplying an inverse conductance matrix representing the resistance model RM by the accumulated stress matrix including the accumulated stress value ASV and a resistance R of the heat dissipation plate 70. In some embodiments, the inverse conductance matrix includes values representing one or more inverse conductances IC of the resistance model RM, which represent a relationship between the accumulated stress value ASV and the temperature potential TP according to heat diffusion within the display panel 10. According to some aspects, the inverse conductances IC of the resistance model RM and the resistance R of the heat dissipation plate 70 are stored in a memory, and the temperature potential calculator 120 retrieves the inverse conductances IC and the resistance R from the memory. In some embodiments, the memory is included in a memory device 1120 as described with reference to FIG. 14.

In an example, the display panel 10 includes first to fourth blocks BL, and the temperature potential calculator 120 calculates a temperature potential matrix including four temperature potentials based on an inverse conduction matrix representing the resistance model RM, first to fourth accumulated stress values ASV corresponding to the first to fourth blocks BL, and the resistance R of the heat dissipation plate 70:

$$\begin{bmatrix} TP_1 \\ TP_2 \\ TP_3 \\ TP_4 \end{bmatrix} = \begin{bmatrix} IC_{11} & IC_{12} & IC_{13} & IC_{14} \\ IC_{21} & IC_{22} & IC_{23} & IC_{24} \\ IC_{31} & IC_{32} & IC_{33} & IC_{34} \\ IC_{41} & IC_{42} & IC_{43} & IC_{44} \end{bmatrix} \times \begin{bmatrix} ASV_1 \\ ASV_2 \\ ASV_3 \\ ASV_4 \end{bmatrix} \times R \qquad (3)$$

In this case, inverse conductances $IC_{11}$, $IC_{12}$, $IC_{13}$, and $IC_{14}$ represent a relationship between the accumulated stress values $ASV_1$, $ASV_2$, $ASV_3$, and $ASV_4$ corresponding to the first to fourth blocks BL and the temperature potential $TP_1$ of the first block BL according to heat diffusion, inverse conductances $IC_{21}$, $IC_{22}$, $IC_{23}$, and $IC_{24}$ represent a relationship between the accumulated stress values $ASV_1$, $ASV_2$, $ASV_3$, and $ASV_4$ corresponding to the first to fourth blocks BL and the temperature potential $TP_2$ of the second block according to heat diffusion, inverse conductances $IC_{31}$, $IC_{32}$, $IC_{33}$, and $IC_{34}$ represent a relationship between the accumulated stress values $ASV_1$, $ASV_2$, $ASV_3$, and $ASV_4$ corresponding to the first to fourth blocks BL and the temperature potential $TP_3$ of the third block according to heat diffusion, and inverse conductances $IC_{41}$, $IC_{42}$, $IC_{43}$, and $IC_{44}$ represent a relationship between the accumulated stress values $ASV_1$, $ASV_2$, $ASV_3$, and $ASV_4$ corresponding to the first to fourth blocks and the temperature potential $TP_4$ of the fourth block according to heat diffusion.

According to some aspects, the temperature calculator 130 calculates the block temperatures BT for the blocks BL based on the region temperatures RT and the temperature potentials TP. In some embodiments, the temperature calculator 130 calculates a block temperature BT by adding a temperature potential TP corresponding to a block BL to a region temperature RT of the panel region PR that the block BL is disposed in. In some embodiments, a block temperature BT of each block BL in the panel region PR is a sum of the region temperature RT for the panel region PR and the temperature potential TP corresponding to each block BL in the panel region PR. In some embodiments, the temperature estimator 100 estimates the temperature of the display panel based on the block temperature BT. For example, in some embodiments, the temperature estimator 100 estimates that the temperature of the display panel includes the block temperature BT. For example, in some embodiments, the temperature estimator 100 estimates that the temperature of the display panel includes an average of each block temperature BT. In some embodiments, the temperature of the display panel is estimated to include a temperature profile including one or more block temperatures BT and one or more region temperatures RT, as described with reference to FIG. 10.

Referring to FIG. 10, temperature estimation accuracy for areas of the display panel 10 in which a temperature sensor 50 is not disposed is increased. Referring to FIG. 10, X-Y plane represents the areas of the display panel, and Z-axis represents estimated temperatures of the areas of the display panel. For example, a temperature potential TP corresponds to an accumulated stress on a block BL provided by input image data IDATA and heat diffusion within the display panel 10. A portion of a temperature curve corresponding to a region temperature RT is indicated by a white circle. Referring to FIGS. 4 and 5, the temperature potential TP is added to the region temperatures RT sensed by the temperature sensor 50 to obtain the block temperature BT so that a block temperature BT for a block BL that is not disposed directly below a temperature sensor 50 may be accurately estimated.

In some embodiments, a temperature sensor 50 may be disposed in the panel region PR of the display panel 10 so that a region temperatures RT of the panel region PR may be accurately sensed. Furthermore, a temperature potential TP of a block BL disposed in the panel region PR may be calculated by multiplying one or more values of a resistance model RM related to heat diffusion within the display panel 10 with the accumulated stress value ASV for a block BL, and the block temperature BT for the block BL may be calculated based on the region temperature RT and the temperature potential TP, thereby incorporating a spatial influence determined by distances between blocks BL in which temperature sensors 50 are disposed and blocks BL in which temperature sensors 50 are not disposed in the calculation of the block temperatures BT. Accordingly, in some embodiments, referring to FIG. 10, although temperature sensors 50 are disposed in only a portion of the display panel 10, a temperature profile for an entirety of the display panel 10 is obtained.

Figure 11:
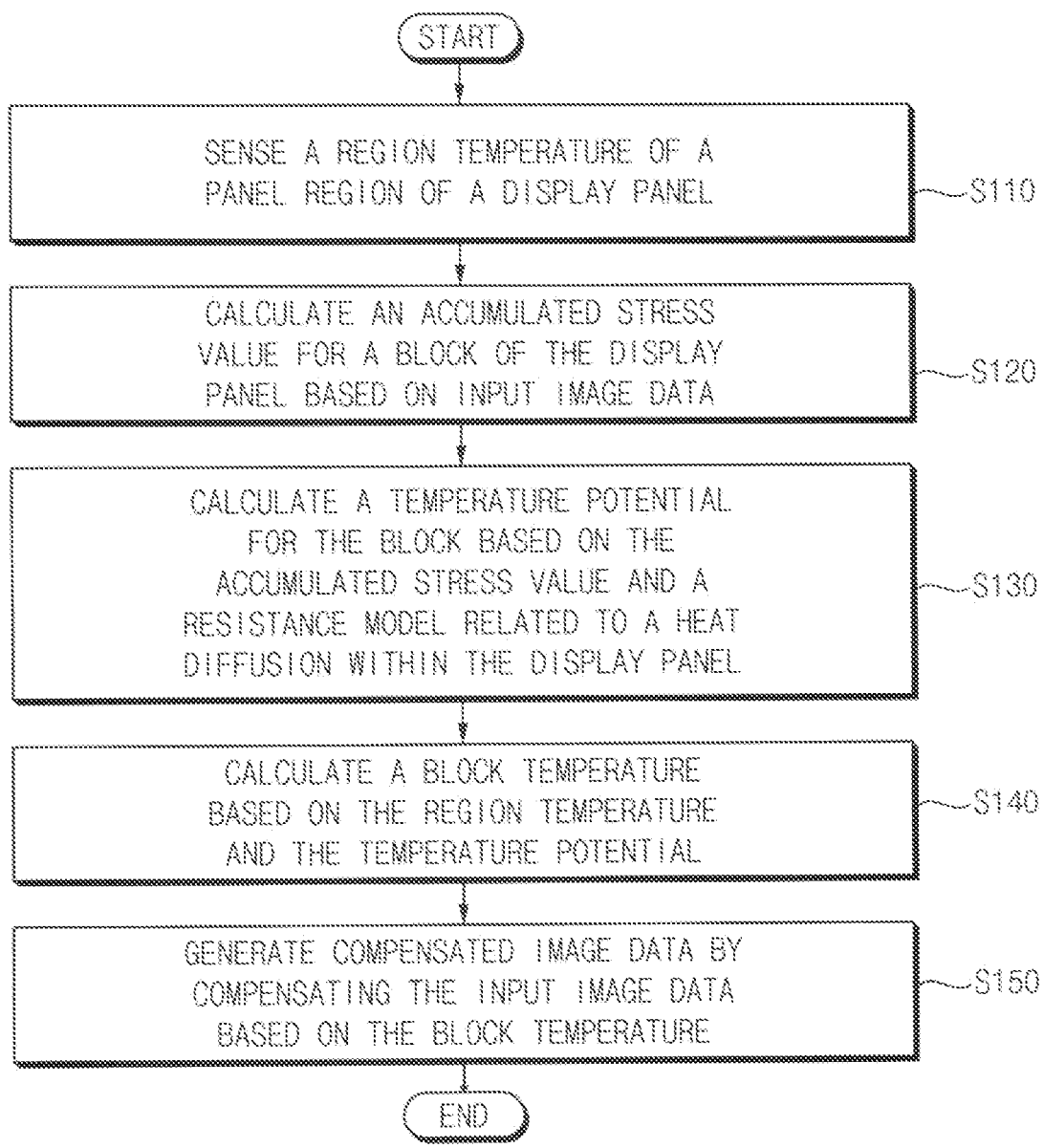
FIG. 11 is a flowchart illustrating a method of driving a display device according to at least one embodiment.

FIG. 11 is a flowchart illustrating a method of driving a display device 1 according to at least one embodiment.

Referring to FIGS. 1, 3, 4, 6, 7, and 11, in operation S110, a temperature sensor 50 senses a region temperatures RT of a panel region PR of a display panel 10. The temperature sensor 50 provides the region temperatures RT to a temperature estimator 100.

In operation S120, a stress calculator 110 of the temperature estimator 100 calculates an accumulated stress value ASV for the block BL of the display panel 10 based on input image data IDATA.

In an example, a stress generator 111 of the stress calculator 110 generates stress values SV for the block BL based on the input image data IDATA. In at least one embodiment, the stress values SV are generated based on N most recent frames included in the input image data ATA.

A weight multiplier 112 of the stress calculator 110 multiplies the stress values SV by one or more weights WT to obtain weighted stress values SV'. In at least one embodiment, the weight multiplier 112 multiplies the stress values SV corresponding to first to N-1$^{th}$ frames of the input image data IDATA by the weights WT. In some embodiments, one or more of the weights WT includes a value that is less than one.

A stress accumulator 113 of the stress calculator 110 generates the accumulated stress value ASV by accumulating the weighted stress values SV'. In at least one embodiment, the stress accumulator 113 adds a stress value SV corresponding to an N$^{th}$ frame of the input image data IDATA to the accumulated weighted stress values SV' corresponding to the first to N-1$^{th}$ frames of the input image data IDATA to obtain the accumulated stress values ASV.

In operation S130, a temperature potential calculator 120 of the temperature estimator 100 calculates a temperature potential TP for the block BL based on the accumulated stress value ASV and a resistance model RM corresponding to heat diffusion within the display panel 10. In at least one embodiment, the temperature potential calculator 120 multiplies an inverse conductance matrix representing the resistance model RM by an accumulated stress matrix including the accumulated stress value ASV and a resistance R of a heat dissipation plate 70 to obtain a temperature potential matrix including the temperature potential TP. In at least one embodiment, the inverse conductance matrix includes an inverse conductance IC representing a relationship between the accumulated stress value ASV and the temperature potential TP according to the heat diffusion within the display panel 10.

In operation S140, a temperature calculator 130 of the temperature estimator 100 calculates the block temperature BT for the block BL based on the region temperature RT and the temperature potential TP. In at least one embodiment, the temperature calculator 130 calculates the block temperature BT by adding the temperature potential TP to the region temperature RT. According to some aspects, by adding the temperature potential TP corresponding to an accumulated stress on a block BL provided by the input image data IDATA and the heat diffusion within the display panel 10 to the region temperature RT, which is accurately sensed by the temperature sensor 50, the block temperatures BT for the block BL is accurately derived. Therefore, a temperature estimation accuracy for positions of the display panel 10 in which a temperature sensor 50 is not disposed may be increased.

In operation S150, the after-image compensator 200 compensates the input image data IDATA based on the block temperature BT to generate the compensated image data CDATA.

Figure 12:
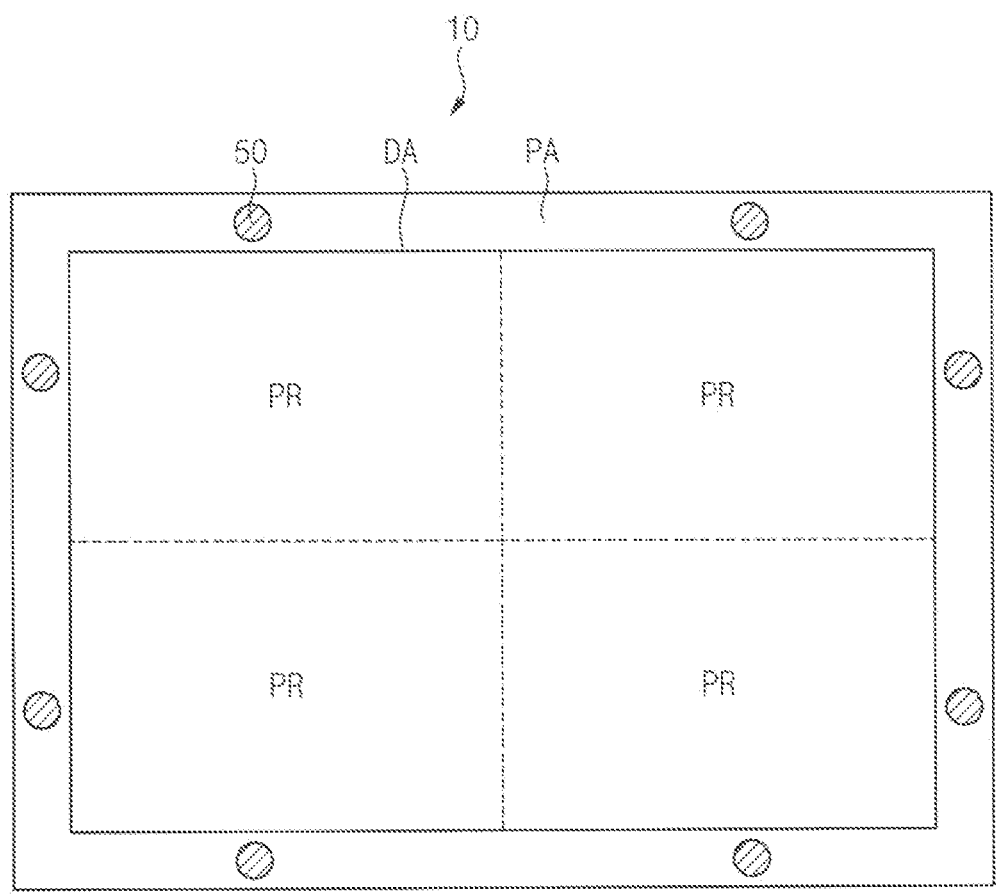
FIG. 12 is a plan view illustrating a display panel according to at least one embodiment.

FIG. 12 is a plan view illustrating a display panel 10 according to at least one embodiment.

Referring to FIGS. 1, 3, and 12, according to some aspects, one or more temperature sensors 50 are disposed on the peripheral area PA of the display panel 10. In at least one embodiment, the temperature sensor 50 is mounted on the peripheral area PA. In at least one embodiment, the temperature sensor 50 is a transistor. In at least one embodiment, the temperature sensor 50 is formed together with a driving transistor (such as T1 described with reference to FIG. 2) and a switching transistor (T2 described with reference to FIG. 2) included in a pixel PX (such as pixel PX described with reference to FIG. 2).

In some embodiments, one or more temperature sensors 50 are spaced throughout the peripheral area PA. In some embodiments, the temperature sensor 50 senses a temperature of a portion of the peripheral area PA adjacent to the display area DA. In some embodiments, the temperature sensor 50 provides the temperature of the portion of the peripheral area PA to the temperature estimator 100 of the controller 40. In some embodiments, the temperature estimator 100 includes a region temperature generator that generates a region temperature RT of the panel region PR based on the temperature of the portion of the peripheral area PA.

Figure 13:
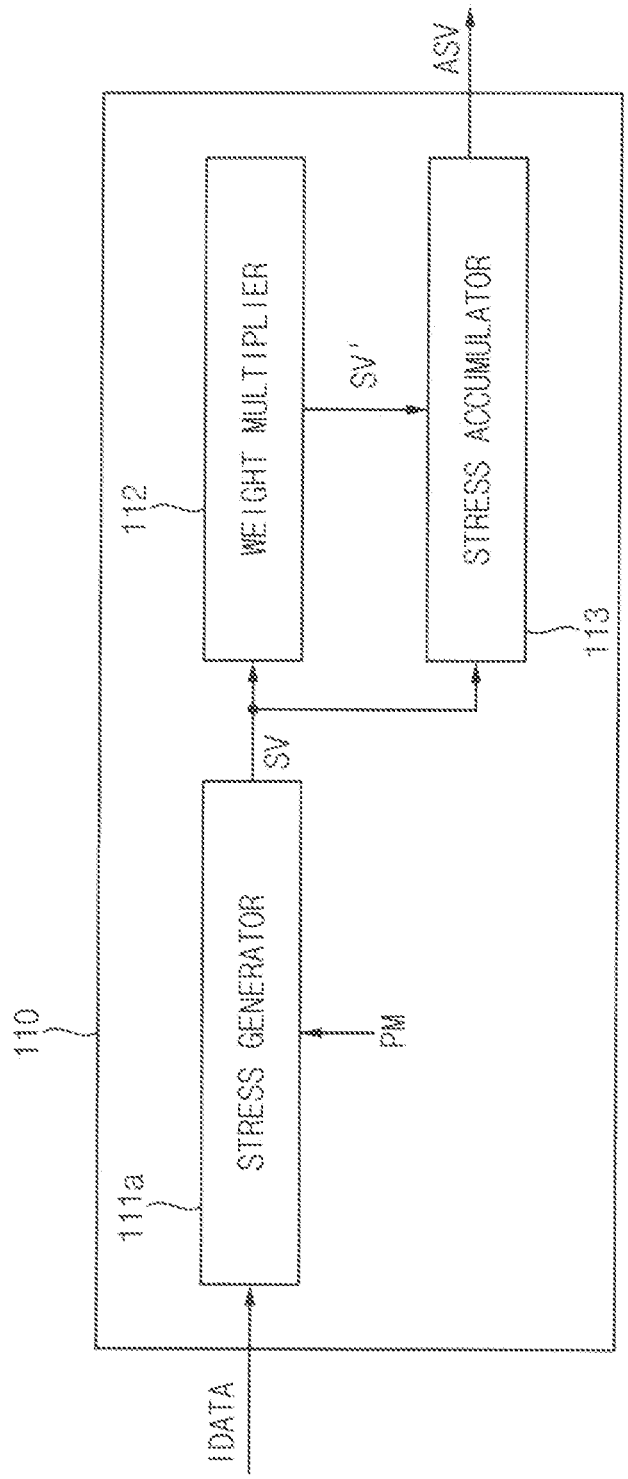
FIG. 13 is a block diagram illustrating an accumulated stress calculator included in a temperature estimator according to at least one embodiment.

FIG. 13 is a block diagram illustrating a stress calculator 110 included in a temperature estimator according to at least one embodiment. In some embodiments, the stress calculator 110 is an example of, or includes aspects of, the corresponding element described with reference to FIG. 6.

Referring to FIGS. 1, 3, 6, and 13, in some embodiments, the stress calculator 110 calculates an accumulated stress value ASV for a block BL based on input image data IDATA and a parameter PM. Heat generated by the block BL of the display panel 10 may be affected by the accumulated stress value ASV. In some embodiments, the stress calculator 110 includes a stress generator 111a, a weight multiplier 112, and a stress accumulator 113. In some embodiments, the stress calculator 110 is an example of, or includes aspects of, the corresponding element described with reference to FIG. 7, and a detailed description of similar aspects is omitted.

In some embodiments, the stress generator 111a generates stress values SV corresponding to a block BL based on the input image data IDATA and the parameter PM. In an example, the stress generator 111a generates the stress values SV corresponding to the block BL by compensating luminances (grayscale values) of the input image data IDATA using the parameter PM. In some embodiments, the parameter PM is stored in a memory (such as the memory device 1120 described with reference to FIG. 14) and is retrieved from the memory by the stress generator 111a. The luminances of the input image data IDATA corresponding to the block BL are generally proportional to currents flowing through the blocks BL. However, ratios of the currents and the luminances of the input image data IDATA corresponding to the blocks BL may deviate among the blocks BL.

In some embodiments, the parameter PM includes one or more values representing a deviation in light emission characteristics among blocks BL. The parameter PM may therefore include information corresponding to the deviation in the ratios of the currents and the luminances of the input image data IDATA among the blocks BL. Accordingly, in some embodiments, the stress generator 111a compensates the luminances of the input image data IDATA using the parameter PM including the one more values representing the deviation in light emission characteristics among the blocks BL to generate stress values SV for the blocks BL corresponding to the currents flowing through the blocks BL.

Figure 14:
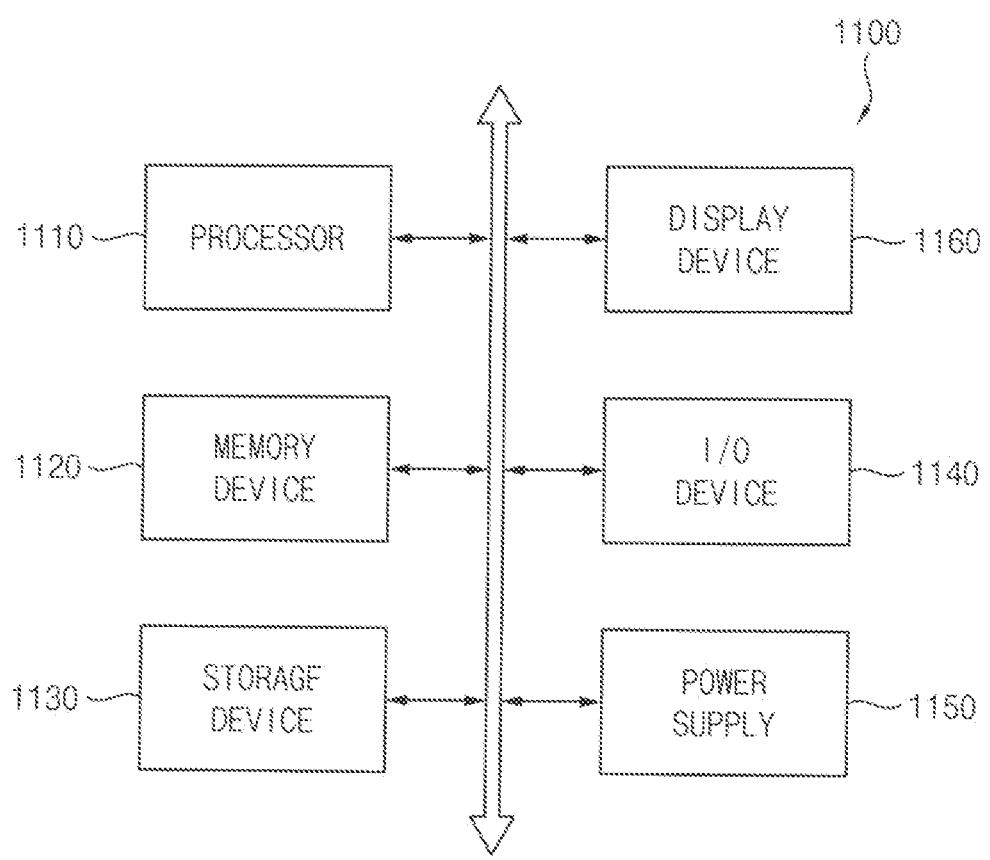
FIG. 14 is a block diagram illustrating an electronic apparatus including a display device according to at least one embodiment.

FIG. 14 is a block diagram illustrating an electronic apparatus including a display device according to at least one embodiment.

Referring to FIG. 14, according to some aspects, the electronic apparatus 1100 includes a processor 1110, a memory device 1120, a storage device 1130, an input/output ("I/O") device 1140, a power supply 1150, and a display device 1160. In some embodiments, the electronic apparatus 1100 further includes a plurality of ports for communicating with a video card, a sound card, a memory card, a universal serial bus ("USB") device, etc. According to some aspects, the display device 1160 is an example of, or includes aspects of, the display device 1 described with reference to FIGS. 1 and/or 4.

According to some aspects, the processor 1110 executes instructions to perform calculations or tasks. In some embodiments, the processor 1110 is implemented as a microprocessor, a central processing unit ("CPU"), or the like. In some embodiments, the processor 1110 is coupled to other components via an address bus, a control bus, a data bus, or the like. In some embodiments, the processor 1110 is coupled to an extended bus such as a peripheral component interconnection ("PCI") bus.

According to some aspects, the memory device 1120 stores data for operations of the electronic apparatus 1100. In an example, the memory device 1120 stores instructions that are executed by the processor 1110. In some embodiments, the memory device 1120 is implemented as a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., a volatile memory device (such as a dynamic random access memory ("DRAM") device, a static random access memory ("SRAM") device, a mobile DRAM device, etc.), or a combination thereof.

According to some aspects, the storage device 1130 is implemented as a solid state drive ("SSD") device, a hard disk drive ("HDD") device, a CD-ROM device, or the like. According to some aspects, the I/O device 1140 includes an input device, such as a keyboard, a keypad, a touchpad, a touch-screen, a mouse device, etc., and an output device, such as a speaker, a printer, etc. According to some aspects, the power supply 1150 supplies a power required for the operation of the electronic apparatus 1100. According to some aspects, the display device 1160 is coupled to other components via the buses or other communication links.

According to some aspects, one or more temperature sensors are disposed on a heat dissipation plate or a peripheral area of a display panel of the display device 1160 so that a temperature of the display panel may be accurately measured. In some embodiments, a temperature estimator included in the display device 1160 or otherwise included in the electronic apparatus 1100 compensates the temperature measured by the temperature sensor based on one or more accumulated stress values and a resistance model corresponding to heat diffusion within the display panel so that the temperature of the display panel is accurately estimated.

According to some aspects, a display device described with reference to the accompanying drawings may be implemented as a display device included in a computer, a notebook, a mobile phone, a smart phone, a smart pad, a PMP, a PDA, an MP3 player, or the like.

While the inventive concept have been particularly shown and described with reference to embodiments thereof, it will be understood that various changes in form and details may be made therein without departing from the spirit and scope of the present disclosure.

What is claimed is:

1. A display device, comprising:
a display panel including a panel region, wherein the panel region includes a block, the block includes a pixel, and a wire is connected to the block;
a temperature sensor sensing a region temperature of the panel region; and
a temperature estimator estimating a temperature of the display panel, the temperature estimator including:
a stress calculator calculating an accumulated stress value corresponding to the block based on input image data;
a temperature potential calculator calculating a temperature potential corresponding to the block based on the accumulated stress value and a resistance of the wire; and
a temperature calculator calculating a block temperature by adding the region temperature and the temperature potential, wherein the temperature of the display panel is estimated based on the block temperature,
wherein the display panel further includes a rear surface and a heat dissipation plate disposed on the rear surface, and
wherein the temperature potential calculator calculates a temperature potential matrix including the temperature potential by multiplying an inverse conductance matrix representing a resistance model related to heat diffusion within the display panel by a resistance of the heat dissipation plate and an accumulated stress matrix including the accumulated stress value.

2. The display device of claim 1, wherein the stress calculator includes:
a stress generator generating stress values corresponding to the block based on the input image data;
a weight multiplier multiplying the stress values by weights to obtain the at least two weighted stress values; and
a stress accumulator generating the accumulated stress value by accumulating the weighted stress values.

3. The display device of claim 1, wherein the display panel further includes a plurality of panel regions and a plurality of blocks, and each panel region of the plurality of panel regions includes at least one block among the plurality of blocks.

4. The display device of claim 1, further comprising:
an after-image compensator generating compensated image data by compensating the input image data based on the block temperature.

5. The display device of claim 1, further comprising:
a heat dissipation plate disposed on a rear surface of the display panel, wherein the temperature sensor is disposed on the heat dissipation plate.

6. The display device of claim 1, wherein:
the display panel further includes a display area and a peripheral area partially surrounding the display area;
the pixel is disposed in the display area; and
the temperature sensor is disposed on the peripheral area.

7. A display device, comprising:
a display panel including a display area, a peripheral area partially surrounding the display area, a rear surface, and a panel region;
a heat dissipation plate disposed on the rear surface of the display panel;
a temperature sensor disposed on the heat dissipation plate or the peripheral area and sensing a region temperature of the panel region of the display panel; and
a temperature estimator estimating a temperature of the display panel based on a temperature potential corresponding to input image data and the region temperature, wherein the temperature potential is added to the region temperature and wherein the temperature potential is determined based on a resistance of the heat dissipation plate,
the temperature estimator including a temperature potential calculator calculating a temperature potential matrix including the temperature potential by multiplying an inverse conductance matrix representing a resistance model related to heat diffusion within the display panel by a resistance of the heat dissipation plate and an accumulated stress matrix including an accumulated stress value.

8. The display device of claim 7, wherein the temperature sensor is disposed on a center of a region of the heat dissipation plate corresponding to the panel region of the display panel.

9. The display device of claim 7, further comprising a plurality of temperature sensors, wherein temperature sensors of the plurality of temperature sensors are spaced throughout the peripheral area.

10. A temperature estimator, comprising:
a stress calculator calculating an accumulated stress value corresponding to a block of a display panel based on input image data, the block including a pixel;
a temperature potential calculator calculating a temperature potential corresponding to the block based on the accumulated stress value and a resistance of a wire connected to the block; and
a temperature calculator calculating a block temperature by adding a region temperature of a panel region of the display panel and the temperature potential,
wherein the display panel further includes a rear surface and a heat dissipation plate disposed on the rear surface, and
wherein the temperature potential calculator calculates a temperature potential matrix including the temperature potential by multiplying an inverse conductance matrix representing a resistance model related to heat diffusion within the display panel by a resistance of the heat dissipation plate and by an accumulated stress matrix including the accumulated stress value.

11. The temperature estimator of claim 10, wherein the stress calculator includes:
a stress generator generating stress values corresponding to the block based on the input image data;
a weight multiplier multiplying the stress values by weights to obtain weighted stress values; and
a stress accumulator generating the accumulated stress value by accumulating the weighted stress values.

12. The temperature estimator of claim 11, wherein the stress generator compensates the input image data using a parameter including a value representing a deviation in light emission characteristics among blocks of the display panel, and wherein the stress values are generated based on the parameter.

13. A method of driving a display device, the method comprising:
sensing a region temperature of a panel region of a display panel;
calculating an accumulated stress value for a block of the display panel based on input image data, wherein the block includes a pixel;
calculating a temperature potential corresponding to the block based on an accumulated stress matrix including the accumulated stress value, an inverse conductance matrix representing a resistance model related to a heat diffusion within the display panel, and a resistance of a heat dissipation plate of the display panel; and
calculating a block temperature based on the region temperature and the temperature potential; and
calculating a temperature potential matrix including the temperature potential by multiplying the inverse conductance matrix by the accumulated stress matrix and the resistance of the heat dissipation plate to obtain the temperature potential.

14. The method of claim 13, further comprising:
generating stress values corresponding to the block based on the input image data;
multiplying the stress values by weights to obtain weighted stress values; and
accumulating the weighted stress values to obtain the accumulated stress value.

15. The method of claim 13, further comprising:
adding the temperature potential to the region temperature to obtain the block temperature.

16. The method of claim 13, further comprising:
generating compensated image data by compensating the input image data based on the block temperature.

* * * * *